Jan. 30, 1934.  C. H. KINDL  1,945,046
SHOCK ABSORBER
Filed Sept. 5, 1931  3 Sheets-Sheet 1

Inventor
CARL H. KINDL
By Spencer, Hardman and Jehu
Attorneys

Jan. 30, 1934.     C. H. KINDL     1,945,046
SHOCK ABSORBER
Filed Sept. 5, 1931     3 Sheets-Sheet 2

Inventor
CARL H. KINDL
By Spencer, Hardman and Rhu
Attorneys

Jan. 30, 1934.  C. H. KINDL  1,945,046
SHOCK ABSORBER
Filed Sept. 5, 1931  3 Sheets-Sheet 3

Inventor
CARL H. KINDL
By Spencer, Hardman
Attorneys

Patented Jan. 30, 1934

1,945,046

UNITED STATES PATENT OFFICE 1,945,046

SHOCK ABSORBER

Carl H. Kindl, Dayton, Ohio, assignor to Delco Products Corporation, Dayton, Ohio, a corporation of Delaware

REISSUED

Application September 5, 1931. Serial No. 561,322

27 Claims. (Cl. 188—88)

This invention relates to improvements in hydraulic shock absorbers.

It is among the objects of the present invention to provide hydraulic shock absorbers capable of automatically adjusting themselves properly to control relative movements of the vehicle body and axles in accordance with the nature of the roadbed over which the vehicle is being operated.

Another object of the present invention is to provide the shock absorbers with automatic adjusting devices which function only in response to movements of the vehicle body.

A still further object of the present invention is to provide automatic adjusting devices for shock absorbers which operate to increase the movement resisting efforts of the shock absorbers only in response to vehicle body movements of predetermined amplitude or acceleration.

When the vehicle is being operated over a boulevard or comparatively smooth roadbed, the vehicle springs provide adequate shock cushioning means and thus it is desirable to reduce the resistance offered by the hydraulic shock absorbers to a proper minimum. However, when traveling over a highway having comparatively deep ruts and high bumps, greater and faster movements of the vehicle body and axles will obtain which, if not properly controlled or cushioned, result in unpleasant shocks and jars being transmitted to the body of the vehicle. Under these conditions, the rapid and extensive oscillations of the car body renders the shock absorbers adjusting devices effective automatically to increase the movement resisting efforts of the shock absorbers whereby said jars and shock are cushioned and properly dissipated.

Further objects and advantages of the present invention will be apparent from the following description, reference being had to the accompanying drawings wherein a preferred embodiment of one form of the present invention is clearly shown.

Figure 3:
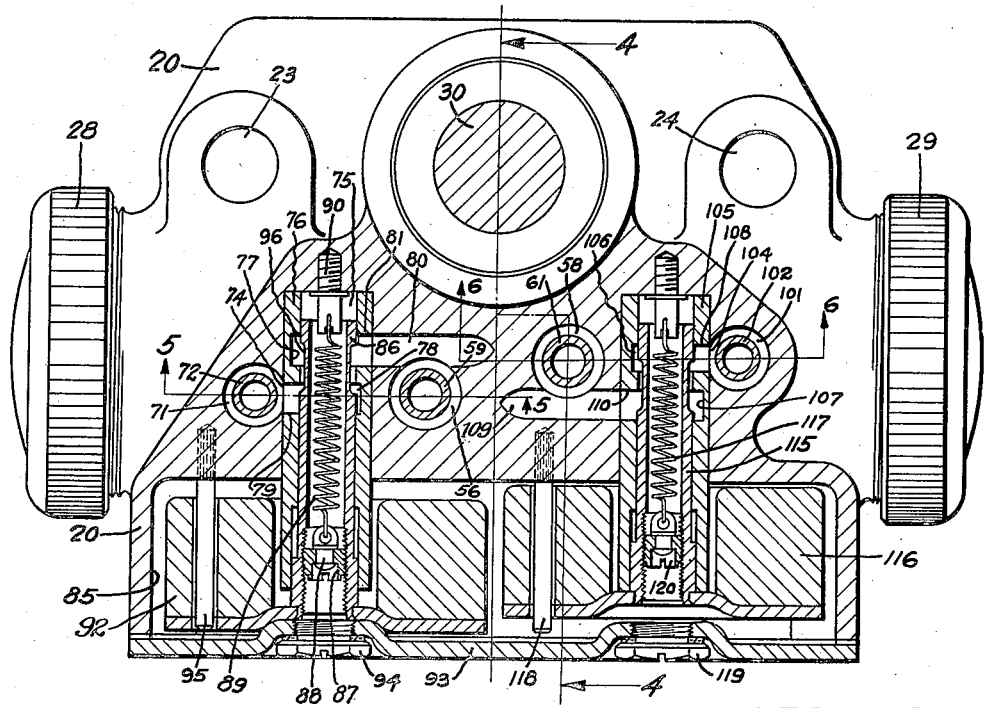
Fig. 3 is a front view of the shock absorber, the automatic adjusting mechanism thereof being shown in section.
Figure 4:
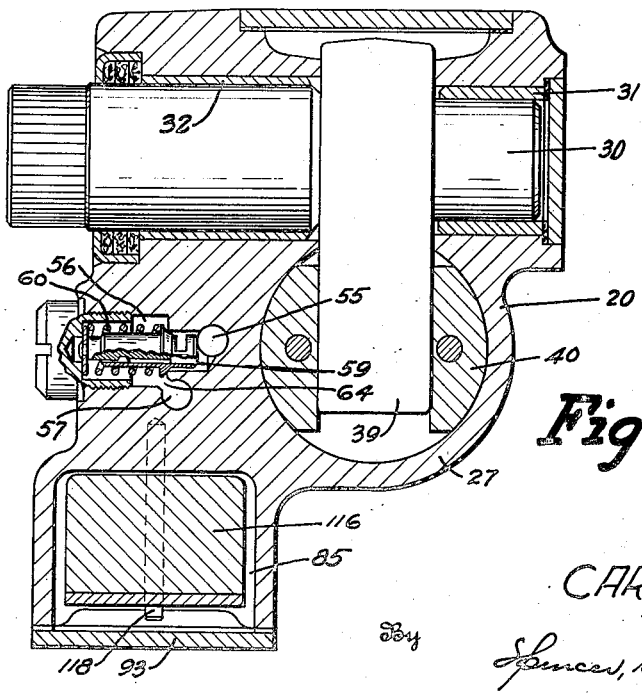
Fig. 4 is a sectional view taken substantially along the line 4—4 of Fig. 3.
Figure 5:
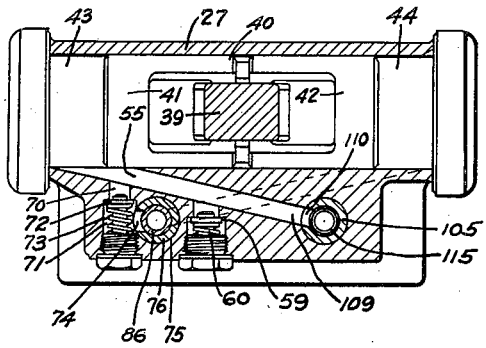
Figure 6:
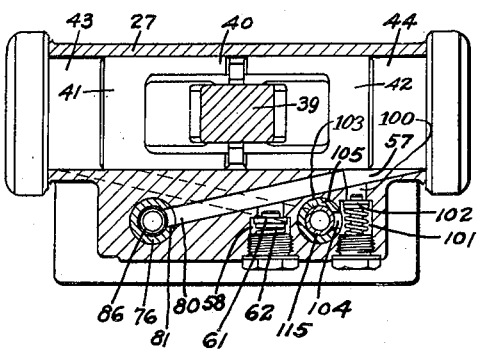

Figs. 5 and 6 are fragmentary sectional views, on a reduced scale, showing the various fluid flow passages in the casing of the shock absorber, Fig. 5 being taken substantially in the plane of the line 5—5 of Fig. 3 and the Fig. 6 in the plane of the line 6—6 of Fig. 3.

Figure 7:
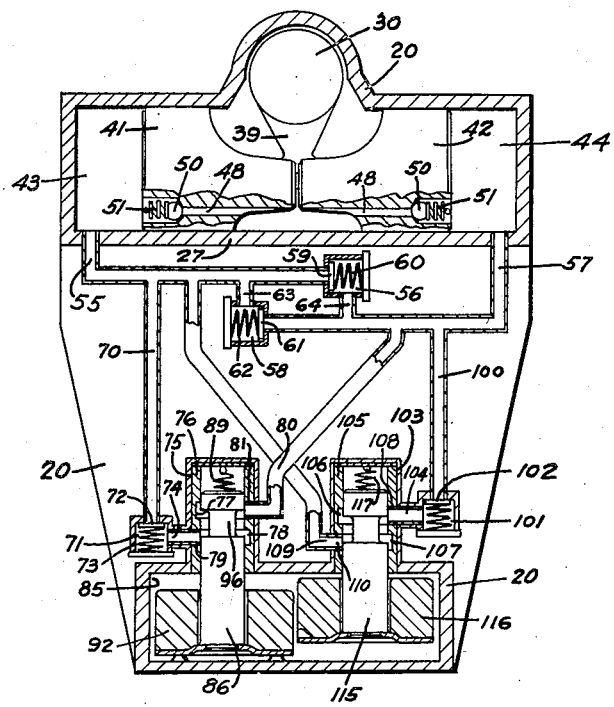

Fig. 7 is a diagrammatic view of the shock absorber showing its fluid passages and control valves.

Figure 1:
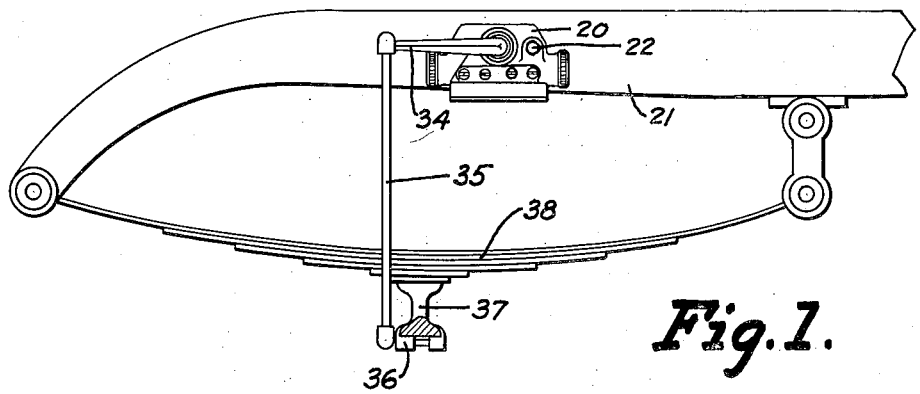
Fig. 1 is a fragmentary view of the frame of the vehicle showing a shock absorber embodying the present invention applied thereto.

Referring to the drawings, the shock absorber is shown comprising a casing 20 which is attached to the frame 21 of the vehicle by bolts 22 which pass through openings 23 and 24 in the casing 20. Casing 20 provides a fluid reservoir 25 and a cylinder 27, the ends of the cylinder being closed by cylinder head caps 28 and 29 respectively. A transverse shaft termed the "rocker shaft" 30 is journalled in bearings 31 and 32 in the casing 20. One end of this shaft 30 extends outside the casing and has the shock absorber operating arm 34 attached thereto. The free end of arm 34 is swively secured to a link 35, the other end of said link being swively attached to a bracket 36 which is anchored to the axle 37 of the vehicle. Frame 21 is supported upon this axle by springs, one of which is designated by the numeral 38 in the Fig. 1.

Figure 2:
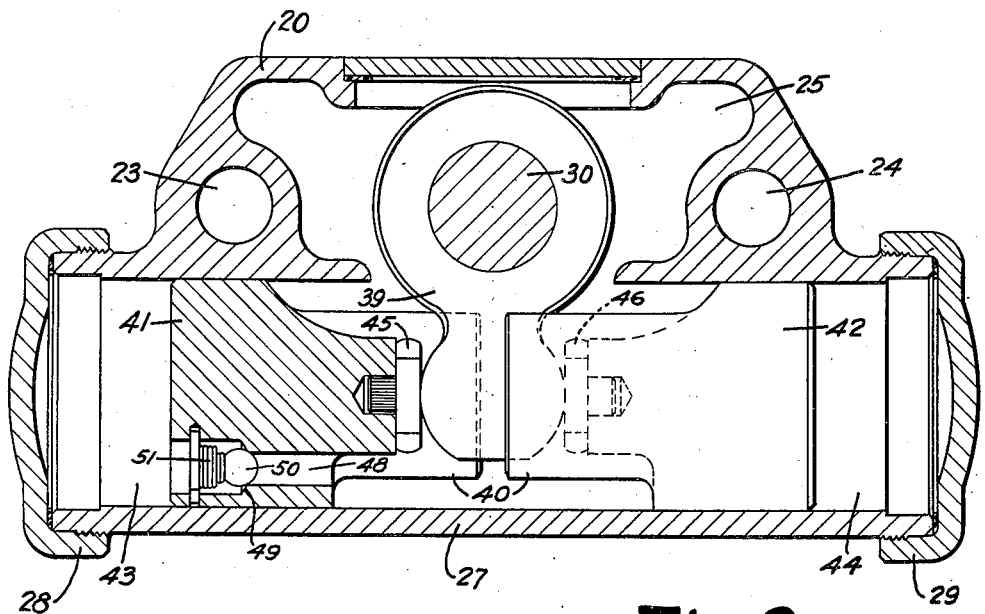
Fig. 2 is a longitudinal sectional view taken through the cylinder of the shock absorber.

Inside the casing 20 the rocker shaft 30 has a rocker arm 39 attached thereto, the free end of which extends into the cylinder 27 as shown in Fig. 2. This rocker arm 39 may be termed the "piston operating member".

Within the cylinder there is provided a piston 40 comprising two piston head portions 41 and 42. The piston head portion 41 forms the "spring compression control chamber" 43 at one end of the cylinder, while piston head portion 42 forms the "spring rebound control chamber" 44 at the opposite end of the cylinder. A space is provided between the piston head portions 41 and 42 into which the operating arm 39 extends. Piston head portion 41 carries a wearpiece 45 and piston head portion 42 carries a wearpiece 46, these wearpieces being so constructed and arranged that they are substantially in constant engagement with the operating member or arm 39 as shown in Fig. 2, thus, when the arm is rotated clockwise the piston is moved toward the left as regards Fig. 2, and as the arm 39 is rotated counter-clockwise, piston 40 is moved toward the right, as regards Fig. 2. Each piston head portion is provided with a through-passage 48 providing a valve seat 49 which is engaged by a ball check valve 50, said valve being maintained upon its seat by a spring 51. These valves act as fluid replenishing devices for their respective compression chambers, whereby fluid is added to the supply of these chambers to compensate for any leaks which might occur.

As has been said before, rotation of the rocker shaft 30 will move piston operating arm 39 toward the right or left within the cylinder 27 in response to movements of the axles or body of the vehicle, thus piston 40 will exert pressure upon the fluid within the spring compression chamber 43, or spring rebound control chamber 44. Means adapted to establish a fluid flow from either one of these chambers in response to such pressure must be provided, and thus a duct 55 is provided in the casing leading from the spring compression control chamber 43 into a valve chamber 56. A similar duct 57 in the casing 20 leads from the spring rebound control chamber 44 to a valve chamber 58 provided in the casing. Within the valve chamber 56 there is provided a fluid control device or pressure release valve 59, urged against a seat by a spring 60, normally to close the duct 55. Within the valve chamber 58 a similar pressure release valve 61 is provided, said valve being urged normally to close duct 57 by a spring 62. Valve chamber 58 is in communication with duct 55 through passage 63 while a similar passage 64 connects the duct 57 with the chamber 56.

From the foregoing it may be seen that at a predetermined, substantially high fluid pressure within the spring compression control chamber 43, the fluid pressure acting upon valve 59 will move said valve against the effect of its spring 60 to establish a flow through the valve chamber 56, passage 64 into the duct 57 and thence into the spring rebound control chamber 44, the cubical area of which is being enlarged as the piston moves to exert pressure upon the fluid within the opposite chamber 43. The same is true when the piston exerts pressure upon the fluid within chamber 44, the pressure then being established against valve 61 which is moved from its seat to establish a flow through chamber 58 and passage 63 through duct 55 into the spring compression control chamber 43.

Another passage 70 in the casing leads from the duct 55, adjacent the compression control chamber 43, to a valve chamber 71. In this valve chamber there is provided a valve 72 which is normally yieldably urged by spring 73 into a position to close communication between passage 70 and valve chamber 71.

Valve chamber 73 has a passage 74 leading therefrom, which passage is in communication with a recess 75 in the casing 20. A tubular member or sleeve 76 fits tightly within the recess 75, said sleeve having two annular, interior grooves 77 and 78. Groove 78 is in communication with the passage 74 through an opening 79 in the sleeve or tubular member 76. The annular groove 77 is in communication with a passage 80 in the casing, through an opening 81 in the side wall of the sleeve or tubular member 76. The passage 80 leads to and is in communication with the duct 57 at a point between the valve 61 and the rebound control chamber 44 as shown in the Fig. 7.

The casing has a comparatively large recess 85, into which recess 75 opens so that one end of sleeve or tubular member 76 extends from the recess 75 into the recess 85, as shown in the Fig. 3. The sleeve or tubular member 76 provides the cylindrical receptacle for a control valve 86 which is of tubular formation as shown in Fig. 3, and has a weight member 92 attached thereto and which, due to the inertia of its weight member and accelerative movements of the casing 20 downwardly regulates fluid flow from passage 70 to passage 80. The control valve 86 is slidably carried within the sleeve or tubular member 76, the end of said inertia valve adjacent the outer end of the sleeve 76 being interiorly threaded to receive a screw plug 87, which provides an adjustable support for the swivel anchoring member 88 to which one end of a spring 89 is attached. The other end of this spring is anchored to a stud 90, which is screwed into the casing at the inner end of the recess 75, as shown in Fig. 3. The weight member 92 of valve 86 normally rests upon a cover plate 93 for the recess 85 of casing 20. A threaded orifice in the cover plate 93, substantially aligned with the sleeve member 76, receives a screw plug 94 which, when removed, renders the screw plug 87 in the valve 86 accessible from the outside of the shock absorber for adjustment purposes. The tension of the spring 89 is so adjusted that a proper portion of the weight of the weighted valve 86 is supported by the cover cap 93. A pilot pin 95, depending from the casing into the recess 85, extends through an opening in the weight 92 to prevent rotation of the weight and its attached valve, however, permitting vertical movement of the sleeve member 76 relative to the valve 86 and its weight.

As shown in Figs. 3 and 7, valve 86 is provided with an exterior annular groove 96, which normally is in communication with both side openings 79 and 81 in the sleeve member 76, so that communication is normally established from the side opening 79 through the space provided inside sleeve 76 by the outer, annular groove 96, to the side opening 81 or vice versa. Downward movement of the casing 20 will cause a relative movement between sleeve 76 and valve 86, due to the inertia of weight 92, and thus the main body portion of valve 86 will slide into the sleeve portion between annular grooves 77 and 78, thereby cutting off communication between the side openings 79 and 81.

A similar inertia weight valve is provided for the spring rebound control chamber 44. Here, a passage 100 leads from duct 57, adjacent the spring rebound control chamber 44, into a valve chamber 101, communication between the duct 100 and the valve chamber 101 being normally cut off by the spring-loaded pressure release valve 102. A recess 103 in the casing is in communication with the valve chamber 101 through a passage 104. A sleeve or tubular member 105 has one end fitting tightly within the recess 103, this sleeve member extending into the recess 85 as shown in Fig. 3. Like tubular member 76, this member 105 has two, spaced interior, annular grooves 106 and 107, the former being in communication with the valve chamber 101 through a side opening 108, in the tubular member 105 and passage 104. The other interior annular groove 107 is in communication with a duct 109 through a side opening 110 in the sleeve or tubular member 105, said duct 109 leading to the duct or passage 55 somewhere between its valve 59 and the spring compression control chamber 43. Valve 115, of tubular construction, is slidably supported within the tubular member 105 and has an inertia weight 116 secured thereto, which weight is located within the recess 85. The weighted valve 115 is suspended by a spring 117 attached in a manner similar to the spring 89, this spring yieldably supporting the weighted valve substantially adjacent the upper surface or ceiling of the recess 85 as shown in Fig. 3. A pin 118 carried by the casing and extending into the recess 85 and through an opening in weight 116 prevents rotation of the weighted valve 115. A removable cap 119 in the cover 93 of the casing renders the adjustable spring anchoring plug 120 of valve 115 accessible from outside the shock absorber.

The shock absorber functions in the following manner:

When the road wheels of the vehicle strike an obstruction in the roadway, the operating arm 34 of the shock absorber through the link connection 35 with the axle of the vehicle is moved clockwise and thus the piston operating arm 39 will move the piston toward the left as regards Figs. 2, 5, 6 and 7. Fluid within the spring compression control chamber 43 will have pressure exerted thereupon, which pressure, if attaining a proper, predetermined value, will move the valve 72 from its seat against the effect of its spring 73 and thus there will be established a flow of fluid from the spring compression control chamber 43 through duct 55, passage 70 into the valve chamber 71, thence through passage 74, opening 79 around the annular groove 96 of the valve 86, through opening 81 in the tubular member 76, through passage 80 into the duct 57 and thence into the rebound control chamber 44. It is assumed that this fluid pressure is insufficient to move valve 59 from its seat. If, after the road wheels strike the obstruction and the springs are compressed, the body of the vehicle is moved upwardly and then dropped with sufficient acceleration to move casing 20 relative to the weighted valve 86—92, said valve tending to remain still due to its inertia, tubular member 76 supported by the casing will be moved relative to the substantially motionless valve 86 and thus the fluid passage through and around the annular groove 96 in said valve 86 will be stopped due to the fact that the main body of the valve 86 has entered into the space between the two interior, annular grooves 77 and 78 of the tubular member 76 and has consequently plugged it. This restriction to the flow of fluid from passage 70 to duct 57 via the inertia weight valve 86—92 will resist the movement of the piston 40 toward the left and thus the downward movement of the vehicle body is cushioned or resisted.

If the striking of the obstruction by the road wheels is sufficiently forceful to cause piston 40 to exert an excessive pressure upon the fluid within the spring compression control chamber 43, then the predetermined high pressure within the duct 55, leading from said chamber 43, will move valve 59 from its seat to establish a restricted flow from the chamber 43, through duct or passage 55, into the valve chamber 56, thence through passage 64 and duct 57 directly into the rebound control chamber 44.

The operation of the shock absorber is similar upon rebound movement of the vehicle springs. As the springs move away from the frame 21 on their rebounding movements, the link connection 35 with the vehicle axles will move the shock absorber operating arm 34 counter-clockwise, thus the piston operating member or arm 39 moves the piston toward the right as regards Figs. 2, 5, 6 and 7 and thereby pressure is exerted upon the fluid within the rebound control chamber 44. If this pressure is not sufficient to move valve 102 from its seat, then a resistance is exerted upon the movement of the piston toward the right. However, if the pressure is sufficient, then valve 102 will be moved from its seat by fluid pressure acting through passages 57 and 100, thus there is established a flow of fluid into the valve chamber 101 from whence the fluid will flow through passage 104, opening 108 through the tubular member 105, around the annular groove in the valve 115, through opening 110 in the tubular member 105 into the passage 109 to duct or passage 55 and then into the spring compression control chamber 43.

If at any time the upward movements of the vehicle body are sufficiently accelerated so that casing 20 is moved relative to the weight 116 of valve 115, then the sleeve 105 is moved relative to valve 115 to close opening 108 in said sleeve, whereby the fluid flow from passage 100 into passage 109 will be restricted, thereby resisting the movement of the piston 40 toward the right. If the movement of the piston 40 toward the right is excessive, creating a predetermined high pressure, then valve 61 will be moved from its seat to establish a restricted flow from duct 57, through valve chamber 58 and passage 63 into the duct 55 which opens into the spring compression control chamber 43.

From the aforegoing it will be seen that predetermined pressures within either compression chamber will operate the respective valves 72 or 102 to establish flows of fluid between the chambers. However, these flows of fluid must be regulated in accordance with the oscillations of the body of the vehicle, consequently inertia weight valves become effective to restrict or shut off this initial flow between the compression chambers. This restriction or shut-off is in accordance with the acceleration of the upward or downward movement of the vehicle frame to which the shock absorber casing is attached and which carries the body of the vehicle. Excessive pressures caused by excessive axle movements or by excessive relative movements between the piston and casing of the shock absorber establish predetermined high pressures which are relieved by valves 59 or 61 respectively.

Applicant's shock absorber is automatically adjusted and controlled in accordance with the accelerations of oscillations of the vehicle frame to compensate for small undulations in the roadway, the high pressure relief valves operating only when excessive high pressures are attained, either when the vehicle is being operated over a comparatively rough highway or at comparatively high speeds. The provision of the valves 72 and 102 effect a slight initial resistance, thereby preventing too free a movement of the vehicle body or axles, still not introducing sufficient resistance to the movements of the axle and body to appreciably affect the operation of the vehicle springs as to provide an uncomfortable ride. This permits the vehicle springs to act as shock absorbing mediums within a certain range, the shock absorber stepping in and assuming control when the movements of the axle and frame of the vehicle would effect a disagreeable ride, if not properly controlled.

While the form of embodiment of the present invention as herein disclosed constitutes a preferred form, it is to be understood that other forms might be adopted, all coming within the scope of the claims which follow.

What is claimed is as follows:

1. A shock absorber comprising, in combination, a casing providing a fluid reservoir and a cylinder; a piston in said cylinder forming a compression chamber therein; a piston reciprocating member; means adapted, in response to fluid pressure, to establish a flow of fluid from the compression chamber; and means adapted, in response to vertical oscillations of the casing, to restrict said flow of fluid from the compression chamber.

2. A shock absorber comprising, in combination, a casing providing a fluid reservoir and a cylinder; a piston in said cylinder forming a compression chamber therein; a piston reciprocating member; a spring loaded valve in the casing adapted, in response to fluid pressure in the compression chamber, to establish a flow of fluid from said chamber; and means supported in the casing and adapted, in response to oscillations of said casing, to restrict said flow of fluid from the compression chamber.

3. A shock absorber comprising, in combination, a casing providing a fluid reservoir and a cylinder; a piston in said cylinder forming a compression chamber therein; a piston reciprocating member; a spring loaded valve in the casing adapted, in response to fluid pressure in the compression chamber, to establish a flow of fluid from said chamber; and a weighted valve suspended from the casing by a resilient member and adapted, in response to oscillations of said casing, to restrict the flow of fluid from the compression chamber.

4. A shock absorber comprising, in combination, a casing providing a fluid containing cylinder; a piston in said cylinder forming a compression chamber therein; a duct in the casing leading from said compression chamber, said duct having two valve chambers; a spring loaded valve in the one valve chamber, normally, yieldably closing said duct; a valve in the other valve chamber normally maintaining the duct open; a weight attached to said last mentioned valve; and a spring supporting the weight and yieldably maintaining said valve in normal position.

5. A shock absorber comprising, in combination, a casing providing a fluid containing cylinder; a piston in said cylinder forming a compression chamber therein; a duct in the casing leading from said compression chamber; means normally closing said duct, but adapted, in response to fluid pressure to establish a flow of fluid from the compression chamber through said duct; and means governed solely by the movements of the casing to restrict said fluid flow.

6. A shock absorber comprising, in combination, a casing providing a fluid containing cylinder; a piston in said cylinder forming a compression chamber therein; a duct in the casing leading from said compression chamber; a spring loaded valve in said duct, normally closing the duct but adapted, in response to a predetermined fluid pressure in the compression chamber, to establish a fluid flow from said chamber through said duct; and a weighted, floating valve in the duct for automatically restricting the fluid flow established by the spring loaded valve, in response to oscillations of the casing.

7. A shock absorber comprising, in combination, a casing providing a fluid containing cylinder; a piston in said cylinder forming two compression chambers therein; a piston reciprocating member; a duct in the casing connecting the two compression chambers; a spring loaded valve in said duct normally shutting off communication between the two compression chambers but adapted, in response to a predetermined fluid pressure in the one of said chambers, to establish a flow of fluid from said chamber into the other chamber; and a valve, governed solely by the movements of the casing for automatically restricting said fluid flow in accordance with the movements of said casing.

8. A shock absorber comprising, in combination, a casing providing a fluid containing cylinder; a piston in said cylinder forming a compression chamber therein; a duct in the casing leading from said compression chamber; means normally closing said duct, but adapted, in response to fluid pressure to establish a flow of fluid from the compression chamber through said duct; and means governed solely by the movements of the casing in one direction only to restrict the said flow of fluid.

9. A shock absorber comprising, in combination, a casing providing a fluid containing cylinder; a piston in said cylinder forming two compression chambers therein; a piston reciprocating member; two interconnected valve chambers in the casing; ducts connecting each valve chamber with a respective compression chamber; a spring loaded pressure release valve in the one valve chamber, normally, yieldably shutting off communication between its valve chamber and the respective compression chamber with which it is connected; and a weighted, floating valve in the other valve chamber, normally maintaining communication between the two valve chambers, but adapted, in response to oscillations of the casing, to restrict said communication in accordance with such casing oscillations.

10. A shock absorber comprising, in combination, a casing providing a fluid containing cylinder; a piston in said cylinder forming a compression chamber therein; a piston operating member; pressure operated means adapted to establish a flow of fluid from said compression chamber, one of said means being operable to establish such a flow at a comparatively lower fluid pressure than the other; and means, governed solely by the movements of the casing, for restricting the fluid flow established by the lower pressure operated means, in accordance with the oscillations of the casing.

11. A shock absorber comprising, in combination, a casing providing a fluid containing cylinder; a piston in said cylinder forming a compression chamber therein; a piston operating member; a duct leading from said compression chamber said duct comprising branch passages; a valve normally closing one of said passages and adapted to open said passage in response to a predetermined fluid pressure within the compression chamber; a valve normally closing the other of said passages but adapted, in response to a predetermined higher pressure, to establish a fluid flow from the compression chamber; and means governed solely by the movement of the casing for restricting the flow of fluid established by the first mentioned valve.

12. A shock absorber comprising, in combination a casing providing a fluid containing cylinder; a piston in said cylinder forming a compression chamber therein; a piston operating member; a duct leading from said compression chamber said duct comprising branch passages; a valve normally closing one of said passages and adapted to open said passage in response to a predetermined fluid pressure within the compression chamber; a valve normally closing the other of said passages but adapted, in response to a predetermined higher pressure, to establish a fluid flow from the compression chamber; and a spring suspended, floating valve adapted to restrict the fluid flow established by the first mentioned valve in accordance with the movement of the casing.

13. A shock absorber comprising, in combination, a casing providing a fluid containing cylinder; a piston in said cylinder forming a compression chamber therein; a piston operating member; a duct in the casing leading from the compression chamber, said duct providing branch passages; a low pressure release valve normally, yieldably closing the one branch passage; a high pressure release valve normally, yieldably closing the other branch passage; and a weighted, floating valve in the passage having the low pressure release valve, said floating valve being adapted to restrict the flow of fluid established by the low pressure release valve in accordance with the movement of the casing.

14. A shock absorber comprising, in combination, a casing providing a fluid containing cylinder; a piston in said cylinder forming a compression chamber therein; a piston operating member; plural means providing for a flow of fluid from the compression chamber in response to pressure therein, one of said means becoming effective at comparatively lower pressure than the other; and inertia controlled means adapted to restrict the low pressure fluid flow in accordance with oscillations of the casing.

15. A shock absorber comprising two relatively movable elements; means governed solely by the movement of one of the elements for checking abnormal movement thereof and means governed by fluid pressure established by the movement of the other or both of said elements for rendering said first mentioned means effective.

16. A shock absorber for a vehicle, comprising an element connectible with the body of the vehicle for movement therewith; a second element connectible and movable with the axle of the vehicle; means interposed between the elements and governed by fluid pressure established by the movement of the axle connected element or both of said elements for checking abnormal movement thereof; and means governed solely by the movement of said body connected element for controlling the operation of said aforementioned means, the axle connected means having no effect on said last-mentioned means.

17. A shock absorber comprising, in combination, a casing; means for circulating fluid within said casing; pressure operated means adapted to prevent said circulation until a predetermined pressure is attained; and means adapted to regulate the circulation of the fluid established by said pressure operated means, in accordance with the movement of the casing and regardless of the pressure.

18. A shock absorber comprising, in combination, a casing providing a fluid containing cylinder; a piston in said cylinder forming two compression chambers therein; a piston operating member; valves adapted, in response to fluid pressure, to establish pressure relieving flows of fluid in either direction between the compression chambers; a duct connecting the two compression chambers and adapted to shunt the fluid flow around said valves; a valve in the last mentioned duct adapted to establish a flow of fluid through said duct at a predetermined fluid pressure; and means governed solely by movement of the casing for restricting said shunt flow.

19. A shock absorber comprising, in combination a casing providing a fluid containing cylinder; a piston in said cylinder forming two compression chambers therein; a piston operating member; a plurality of ducts providing communication between the compression chambers; spring loaded valves in certain of said ducts, adapted to establish flows of fluid between the compression chambers in response to a predetermined fluid pressure in either of said chambers; spring loaded valves in other of said ducts, adapted to establish flows of fluid between the compression chambers and around the first mentioned spring loaded valves in response to fluid pressures comparatively lower than that required to operate the first mentioned spring loaded valves; and means governed solely by movements of the casing for restricting the fluid flow established by the last mentioned spring loaded valves.

20. A shock absorber comprising, in combination, a casing providing a fluid containing cylinder; a piston in said cylinder forming two compression chambers therein; a piston operating member; fluid flow control devices adapted to establish flows of fluid between the compression chambers in response to a predetermined pressure in either of said chambers; a plurality of ducts adapted respectively to shunt the fluid flow around said fluid flow control devices; a spring loaded check valve in each of said ducts adapted, in response to a comparatively lower pressure than the aforementioned predetermined pressure, to establish fluid flows between the compression chambers, one in one direction the other in the opposite direction; and a floating, weighted valve in each of said ducts adapted respectively to regulate the fluid flow through its duct in accordance with the movement of the casing and regardless of the pressure in the compression chambers.

21. A shock absorber comprising, in combination, a casing providing a fluid containing cylinder; a piston in said cylinder forming two compression chambers therein; a piston operating member; fluid flow control devices adapted to establish flows of fluid between the compression chambers in response to a predetermined pressure in either of said chambers; a plurality of ducts adapted respectively to shunt the fluid flow around said fluid flow control devices; a spring loaded check valve in each of said ducts adapted, in response to a comparatively lower pressure than the aforementioned predetermined pressure, to establish fluid flows between the compression chambers, one in one direction the other in the opposite direction; and a floating, weighted valve in each of said ducts adapted respectively to regulate the fluid flow through its duct, the one weighted valve acting in response to movement of the casing in one direction only, the other acting in response to opposite casing movements only, both weighted valves acting independently of fluid pressure.

22. A shock absorber comprising, in combination, a casing providing a fluid containing cylinder; a piston in said cylinder forming two compression chambers therein; a piston operating member; fluid flow control devices adapted to establish flows of fluid between the compression chambers in response to a predetermined pressure in either of said chambers; a plurality of ducts adapted respectively to shunt the fluid flow around said fluid flow control devices; a spring loaded check valve in each of said ducts adapted, in response to a comparatively lower pressure than the aforementioned predetermined pressure, to establish fluid flows between the compression chambers, one in one direction the other in the opposite direction; a normally open slide valve in each duct; a weight on each slide valve; a spring supporting each valve and its weight in a floating manner; a stop preventing downward movement of one weighted valve; a stop preventing upward movement of the other weighted valve, whereby in response to upward and downward movements of the casing only, said weighted slide valves are adapted to regulate the fluid flow through their respective ducts.

23. A shock absorber comprising, in combination, a casing providing a fluid containing cylinder; a piston in said cylinder forming two compression chambers therein; pressure operated means adapted to establish a flow of fluid between the compression chambers in either direction in response to a predetermined fluid pressure in either compression chamber; a duct in the casing adapted to establish a shunt flow of fluid between the compression chambers and around one of said pressure operated means; a normally closed check valve in said duct, adapted, in response to a pressure below said predetermined fluid pressure, to establish a flow of fluid through said duct in one direction only; and an inertia valve in the duct adapted to regulate the flow of fluid therethrough in accordance with the movement of the casing only.

24. A shock absorber comprising, in combination, a casing providing a fluid containing cylinder; a piston in said cylinder forming two compression chambers therein; a piston operating member; two pressure operated means adapted to establish flows of fluid from one compression chamber into the other, one of said means establishing its fluid flow at a comparatively lower pressure than the other; means governed solely by the movement of the casing for restricting the flow established by said low pressure operated means; and a pressure operated member adapted to establish a flow of fluid from the said other compression chamber into the first mentioned compression chamber in response to a predetermined pressure within said other compression chamber.

25. A shock absorber for controlling the movements of the frame and axle of a vehicle comprising, in combination, a casing attached to the frame of the vehicle and providing a cylinder adapted to contain a fluid; a piston in said cylinder forming a compression control and a rebound control chamber, said piston being operatively connected with the axle of the vehicle; pressure operated valves adapted to establish flows of fluid from the rebound control chamber into the compression control chamber, one of said valves operating its flow of fluid at a comparatively lower pressure than the other; a pressure operated valve adapted to establish a flow of fluid from the compression control chamber into the rebound control chamber at a predetermined fluid pressure within the former chamber; and a spring suspended, weighted valve adapted to regulate the flow of fluid established by the aforementioned low pressure valve in response to and in accordance with upward movements of the frame of the vehicle to which the casing of the shock absorber is attached.

26. A shock absorber for absorbing energy, comprising, in combination, a fluid containing chamber of variable volume, means through which fluid is admitted into said chamber, a conduit through which the fluid flows when leaving said chamber, inertia means for controlling the flow of fluid through said conduit, and resilient means for also controlling the flow of fluid through said conduit.

27. A shock absorber for absorbing energy, comprising, in combination, a fluid containing chamber of variable volume, means through which fluid is admitted into said chamber, a conduit through which the fluid flows when leaving said chamber, inertia means for closing the conduit to resist the flow of fluid therethrough, and resilient means for also closing the conduit to resist the flow of fluid therethrough.

CARL H. KINDL.